US009152749B2

(12) United States Patent  (10) Patent No.: US 9,152,749 B2
Ricchetti et al.  (45) Date of Patent: Oct. 6, 2015

(54) MANAGEMENT SYSTEM, METHOD AND APPARATUS FOR LICENSED DELIVERY AND ACCOUNTING OF ELECTRONIC CIRCUITS

(75) Inventors: Michael Ricchetti, Nashua, NH (US); Christopher J. Clark, Durham, NH (US)

(73) Assignee: Intellitech Corp., Dover, NH (US)

( * ) Notice: Subject to any disclaimer, the term of this patent is extended or adjusted under 35 U.S.C. 154(b) by 1930 days.

(21) Appl. No.: 10/347,904

(22) Filed: Jan. 21, 2003

(65) Prior Publication Data

US 2003/0140255 A1 Jul. 24, 2003

Related U.S. Application Data

(60) Provisional application No. 60/350,885, filed on Jan. 23, 2002.

(51) Int. Cl.
*G06F 17/50* (2006.01)
*G06F 21/10* (2013.01)
*G06Q 30/00* (2012.01)

(52) U.S. Cl.
CPC ............ *G06F 17/5045* (2013.01); *G06F 21/10* (2013.01); *G06Q 30/018* (2013.01); *G06F 2217/66* (2013.01)

(58) Field of Classification Search
CPC .................................................. G06F 17/5045
USPC .......................................... 705/50–79; 716/1
See application file for complete search history.

(56) References Cited

U.S. PATENT DOCUMENTS

| | | | | |
|---|---|---|---|---|
| 4,601,033 A | * | 7/1986 | Whelan | 714/732 |
| 5,343,526 A | * | 8/1994 | Lassers | 705/59 |
| 5,375,206 A | | 12/1994 | Hunter et al. | 395/200 |
| 5,553,143 A | | 9/1996 | Ross et al. | 380/25 |
| 5,579,222 A | | 11/1996 | Bains et al. | 395/712 |
| 5,671,412 A | * | 9/1997 | Christiano | 1/1 |
| 5,717,604 A | | 2/1998 | Wiggins | 364/514 C |
| 5,790,664 A | * | 8/1998 | Coley et al. | 709/203 |

(Continued)

OTHER PUBLICATIONS

Derfler, "How Networks Work", Bestseller Edition, 1996, Ziff-Davis Press, Emeryville, CA, all pages.*

(Continued)

*Primary Examiner* — Jacob C. Coppola

(57) ABSTRACT

A system and method of licensing electronic circuit designs within target electronic circuits or devices that allows secure delivery and reliable accounting of the licensed circuit designs on a per-usage basis. The method includes determining whether an electronic circuit design is licensable for use within a target electronic circuit by verifying licensing information included in a set of predetermined vectors associated with the electronic circuit design. In the event it is determined that the electronic circuit design is licensable for use within the target electronic circuit, the set of vectors is applied to the target electronic circuit by a licensing controller. Next, in response to a predetermined event, an attribute of the licensing information is updated to indicate the licensed use of the electronic circuit design within the target circuit. The licensing system allows IP core providers and IP core users to account for the use of licensed electronic circuit designs on a per-usage basis with higher accuracy, thereby providing increased assurance that the electronic circuit designs are being licensed in a manner that is fair to all parties.

13 Claims, 8 Drawing Sheets

(56) References Cited

U.S. PATENT DOCUMENTS

| | | | |
|---|---|---|---|
| 5,796,941 A | 8/1998 | Lita | 395/187.01 |
| 5,841,867 A * | 11/1998 | Jacobson et al. | 713/187 |
| 5,867,396 A * | 2/1999 | Parlour | 716/104 |
| 5,903,762 A * | 5/1999 | Sakamoto et al. | 717/178 |
| 5,925,127 A * | 7/1999 | Ahmad | 726/31 |
| 5,978,476 A * | 11/1999 | Redman et al. | 705/51 |
| 6,035,107 A * | 3/2000 | Kuehlmann et al. | 716/103 |
| 6,105,137 A | 8/2000 | Graunke et al. | 713/201 |
| 6,205,574 B1 * | 3/2001 | Dellinger et al. | 716/117 |
| 6,249,893 B1 * | 6/2001 | Rajsuman et al. | 714/741 |
| 6,256,770 B1 * | 7/2001 | Pierce et al. | 716/105 |
| 6,305,005 B1 | 10/2001 | Burnham | |
| 6,578,174 B2 * | 6/2003 | Zizzo | 716/1 |
| 6,594,799 B1 * | 7/2003 | Robertson et al. | 716/1 |
| 6,594,802 B1 * | 7/2003 | Ricchetti et al. | 716/136 |
| 6,654,889 B1 * | 11/2003 | Trimberger | 713/191 |
| 6,711,674 B1 * | 3/2004 | Burnham | 713/1 |
| 6,832,358 B2 * | 12/2004 | Foster et al. | 716/4 |
| 6,904,527 B1 * | 6/2005 | Parlour et al. | 713/189 |
| 6,968,478 B1 * | 11/2005 | Edwards et al. | 714/32 |
| 6,993,730 B1 * | 1/2006 | Higgins et al. | 716/107 |
| 7,017,043 B1 * | 3/2006 | Potkonjak | 713/176 |
| 7,162,644 B1 * | 1/2007 | Trimberger | 713/189 |
| 7,263,597 B2 * | 8/2007 | Everdell et al. | 712/11 |
| 7,363,501 B2 * | 4/2008 | Watanabe et al. | 713/182 |
| 2002/0105529 A1 * | 8/2002 | Bowser et al. | 345/629 |
| 2002/0199110 A1 * | 12/2002 | Kean | 713/189 |
| 2003/0009715 A1 * | 1/2003 | Ricchetti et al. | 714/727 |
| 2003/0149669 A1 * | 8/2003 | Howells et al. | 705/51 |
| 2003/0167144 A1 * | 9/2003 | Wang et al. | 702/119 |
| 2004/0019566 A1 * | 1/2004 | Foster et al. | 705/59 |
| 2004/0031030 A1 * | 2/2004 | Kidder et al. | 717/172 |
| 2005/0069128 A1 * | 3/2005 | Inoue et al. | 380/42 |

OTHER PUBLICATIONS

White, "How Computers Work", Millennium Edition, 1999, Que Corporation, Indianapolis, IN, all pages.*
Gralla, "How the Internet Works", Millennium Edition, 1999, Que Corporation, Indianapolis, IN, all pages.*
Muller, "Desktop Encyclopedia of the Internet", 1999, Artech House Inc., Norwood, MA, all pages.*

* cited by examiner

```
# IPL: <Issue> <Product> <Version> <+/-Licenses> <Expiration> <Vendor> <Customer> <IPLC_SN> <Key>

IPL: 1 ab1 1 10000 12312002 2 f1 1270 8D63FCEFF59D
IPL: 1 ab8 1 100 12312002 2 f1 1270 BFC009764E07
IPL: 2 ab1 1 300 12312002 2 f1 1270 A9DBCC212ED
IPL: 03e10ddc58eea9091043e48691ad03d2
IPL: 1 dd0 7 3500 00000000 A f1 1271 186F0CF4F99D
....
```

MANAGEMENT SYSTEM, METHOD AND APPARATUS FOR LICENSED DELIVERY AND ACCOUNTING OF ELECTRONIC CIRCUITS

CROSS REFERENCE TO RELATED APPLICATIONS

This application claims priority of U.S. Provisional Patent Application No. 60/350,885 filed Jan. 23, 2002 entitled MANAGEMENT SYSTEM, METHOD AND APPARATUS FOR LICENSED DELIVERY AND ACCOUNTING OF INTELLECTUAL PROPERTY IN ELECTRONIC CIRCUITS.

STATEMENT REGARDING FEDERALLY SPONSORED RESEARCH OR DEVELOPMENT

N/A

BACKGROUND OF THE INVENTION

The present invention relates generally to the licensing of electronic circuit designs programmably configured or designed into target electronic circuits, and more specifically to a system and method of securely licensing and reliably accounting for the delivery of licensed electronic circuit designs for use within target electronic circuits.

In recent years, as the size and complexity of Integrated Circuits (ICs) have increased, many circuit designers have found that it was no longer practical to design ICs using existing proprietary circuits. As a result, circuit designers adopted alternative approaches to IC design that allowed them to take advantage of advances in semiconductor technology, while satisfying the increased demand for electronic products.

One such approach adopted by circuit designers is known as "design re-use", in which functional circuit blocks from one or more existing IC designs or third party providers are re-used to create a new IC design. This approach allows circuit designers to take advantage of new semiconductor technology and maintain increased productivity because they do not have to design all of the circuits within the IC. Design re-use can be employed to achieve product miniaturization and cost reduction, to enable a new product with several functions that were previously implemented within separate chips to be integrated into a single IC, and/or to create a new product that combines existing functions with newly designed capabilities.

Moreover, design re-use, along with advances in semiconductor technology and Electronic Design Automation (EDA) tools, have made it possible to design a System on a Chip (SoC), in which an entire system can be designed and configured to fit within a single IC package. Such SoC designs typically employ high level functional circuit blocks, which are frequently referred to as "IP cores" because they generally comprise the Intellectual Property (IP) of the circuit designer or a third party provider(s). SoC design approaches employing IP cores have allowed circuit designers to accelerate product development cycles. For example, a circuit designer (the "IP user") may obtain one or more IP cores from a third party provider (the "IP provider"), thereby obviating the need to design the core circuits themselves, and allowing integration of the core circuits at higher levels in the design development process.

When an IP provider provides an IP core to an IP user, the IP provider typically licenses the circuit design to the IP user for use in the development of an IC or system. The IP core can be licensed in one of two ways—on a "per-project" basis or on a "per-usage" basis. When licensed on a per-project basis, the license is generally granted to the IP user for use within a particular IC, product, or family of ICs or products, and a flat fee is charged for the duration of the project. When licensed on a per-usage basis, a fee or royalty is generally charged for each individual use of the IP core, often regardless of what product it is designed into, or the duration of the project.

Per-usage licensing is generally viewed as being fairer and more predictable than per-project licensing for both the IP provider and the IP user. For example, the flat fee required for per-project licensing is usually relatively high to cover the expected usage of the IP core over the project duration. Further, the IP provider and the IP user normally have to estimate both the expected product volume and the expected manufacturing duration. If the product does not reach the estimated product volume, then the IP user typically pays more for each usage of the IP core. Alternatively, if the expected product volume is exceeded, then the IP provider typically licenses each IP core at a lower fee or royalty. As a result, the fees paid by the IP user, and the royalties received by the IP provider, may be significantly different from what the parties originally bargained for.

In contrast, when an IP core is licensed on a per-usage basis, the IP provider and the IP user generally do not have to rely upon the expected product volume and/or the expected manufacturing duration, which can vary considerably from the original estimates. Further, per-usage licensing allows the IP user to spread the cost of licensing the IP core out over the product's manufacturing duration. However, even though per-usage usage licensing is generally fairer and more predictable than per-project licensing, per-usage licensing typically does not afford the IP provider a reliable way of accounting for the actual IP core usage, i.e., the number of IP cores that have employed in the manufacturing of an IC. For example, the IP provider may have to rely upon the IP user to give an accurate accounting of the number of IP cores used in various products.

Although there are software licensing systems available today for per-use monitoring of the execution of software applications, there remains a need for systems and methods for managing the secure delivery and reliable accounting of licensed circuit designs within target electronic circuits and devices.

BRIEF SUMMARY OF THE INVENTION

In accordance with the present invention, a system and method of licensing electronic circuit designs for use within target electronic circuits or devices is provided. The licensing system allows for the secure delivery and reliable accounting of the licensed circuit designs on a per-usage basis.

In one embodiment, the method of licensing electronic circuit designs includes determining whether an electronic circuit design is licensable for use within a target electronic circuit by verifying licensing information included in data associated with the electronic circuit design, in which the licensing information has at least one attribute. In the event it is determined that the electronic circuit design is licensable for use within the target electronic circuit, the data associated with the circuit design such as a set of vectors is applied to the target electronic circuit via a licensing controller. Next, in response to a predetermined event, the attribute of the licensing information is updated to indicate the licensed use of the electronic circuit design within the target circuit. For example, a set of test vectors may be applied to the target circuit via the licensing controller. In the event it is determined that the electronic circuit design has passed one or more tests associated with the test vectors, the attribute of the licensing information is updated. Alternatively, programmable configuration data may be applied to the target circuit via the licensing controller. In this case, in the event it is determined that the electronic circuit design has been programmably configured for a first time within the target circuit, the attribute of the licensing information is updated.

In another embodiment, the licensing system comprises a computerized device such as a computer including a first storage configured to store data associated with at least one electronic circuit design, in which the stored data includes first predetermined information having at least one attribute. The system further includes a licensing controller coupled to the computer and coupleable to a target electronic circuit. The licensing controller is configured to convey the data between the computer and the target circuit. The licensing controller includes a second storage for storing second predetermined information associated with the electronic circuit design, in which the second predetermined information also has at least one attribute. Each of the attributes of the first and second predetermined information may include an identifier for a respective licensing controller.

In this embodiment, the computer is configured to access the attribute of the second predetermined information from the licensing controller storage, compare the respective licensing controller identifiers of the first and second predetermined information, and in the event the respective licensing controller identifiers match, apply the data associated with the electronic circuit design to the target circuit via the licensing controller. For example, the applied data may include a set of test vectors or programmable configuration data. In this case, the licensing system accounts for use of the electronic circuit design within the target circuit by managing and monitoring the application of the test vectors or the configuration data.

The presently disclosed licensing system allows IP core providers and IP core users to account for the use of licensed electronic circuit designs within target electronic circuits on a per-usage basis with higher accuracy, thereby providing increased assurance that the electronic circuit designs are being licensed in a manner that is fair to all parties.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the drawings of which:

FIG. 4 is a representation of a license features file used in the licensing system of FIG. 1;

DETAILED DESCRIPTION OF THE INVENTION

U.S. Provisional Patent Application No. 60/350,885 filed Jan. 23, 2002 is incorporated herein by reference.

Figure 1:
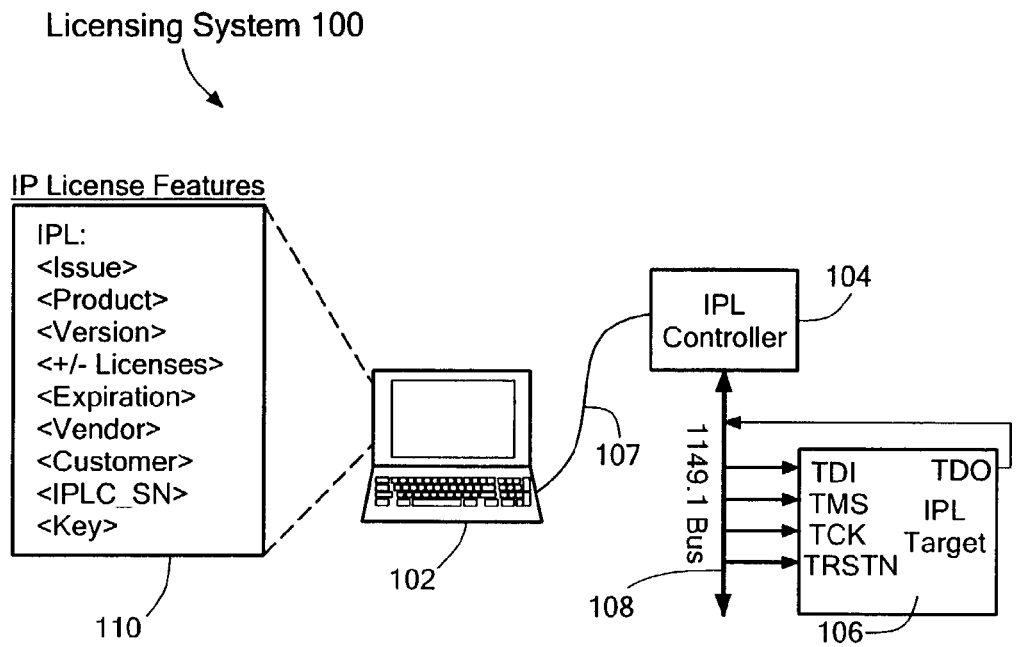
FIG. 1 is a block diagram of a licensing system according to the present invention.

FIG. 1 depicts an illustrative embodiment of an Intellectual Property Licensing (IPL) system 100, in accordance with the present invention. In the illustrated embodiment, the licensing system 100 includes a computer 102 and a licensing controller 104 connected to the computer 102. For example, the computer 102 may comprise a general-purpose computer (e.g., a PC or laptop) including at least one processor, at least one memory such as Read-Only Memory (ROM) and Random Access Memory (RAM), and at least one data storage such as a disk. The licensing controller 104 includes circuitry (not shown) configured to allow the controller 104 to communicate with the computer 102 via a first bus ("P Bus") 107. Further, the licensing controller 104 is configured to access a target electronic circuit 106 via a second bus 108 for programmable configuration and/or testing purposes. For example, the second bus 108 may comprise an IEEE 1149.1 bus configured to allow the licensing controller 104 to access the target circuit 106 using a known Test Access Port (TAP) protocol. The target circuit 106 may comprise any suitable programmable circuit such as Programmable Read Only Memory (PROM), FLASH memory, a Field Programmable Gate Array (FPGA), or a Complex Programmable Logic Device (CPLD). Alternatively, the target circuit 106 may comprise any suitable non-programmable circuit such as an Application Specific IC (ASIC) or a Random Access Memory (RAM). It is noted that the licensing controller 104 may access the target circuit 106 to programmably configure or test a licensed electronic circuit design within the target circuit at a selected level of the design hierarchy. For example, the licensing controller 104 may access the licensed circuit design as an embedded core or an embedded memory within the target circuit, which may be configured as a packaged IC or an FPGA within a system of Printed Circuit Boards (PCBs).

In the presently disclosed embodiment, the licensing controller 104 is employed to test the target circuit 106, and/or perform In-System Configuration (ISC) of the circuit 106, in accordance with the IEEE 1149.1 and 1532 Standards described in the IEEE 1149.1 Standard Test Access Port and Boundary Scan Architecture specification and the IEEE 1532 Standard for In-System Configuration of Programmable Devices, respectively, both of which are incorporated herein by reference. It should be understood, however, that alternative test, scan, and ISC access methodologies and protocols may also be employed. Further, the computer 102 and/or the licensing controller 104 may alternatively comprise Automatic Test Equipment (ATE) or any other suitable test/programming resource.

The licensing system 100 includes a licensing facility installed in the memory of the computer 102, and a non-volatile data storage included in the licensing controller 104, to license and account for the use of licensed circuit designs (e.g., embedded cores and memories) within the target circuit 106. It should be understood that the term "licensing" as used herein refers to any suitable method of obtaining revenue for each individual use of a core electronic circuit design, e.g., obtaining revenue for each core circuit design on a per-usage basis.

FIG. 1 depicts an expanded view of an exemplary License Features file 110 (see FIG. 1). As shown in FIG. 1, the License Features file 110 comprises a text file stored in the memory of the computer 102 that includes licensing data associated with the core circuit design to be delivered to the target circuit 106. As shown in FIG. 1, the License Features file 110 includes features or attributes of the particular circuit design being licensed. For example, these attributes may include a license "Issue" number, a "Product" code, a "Version" code, a number of "Licenses" to be added/deleted, a license "Expiration" code, a "Vendor" code, a "Customer" code, and a licensing controller serial number "IPLC_SN", i.e., the serial number of the licensing controller 104. Additionally, each set of attributes in the License Features file 110 includes a "Key", which is generated using an encryption algorithm that takes into account the attribute information for the circuit design being licensed. By verifying the information in the License Feature file 110 using the encrypted Key and the licensing data maintained in the non-volatile data storage of the licensing controller 104, the licensing system 100 enables secure licensed delivery of the core circuit design to the target circuit 106.

Licensing System

In the presently disclosed embodiment, the licensing system 100 (see FIG. 1) is configured to track the use of licensed circuit designs within the target circuit 106 based on programming data or test data (e.g., vectors) applied or delivered to the circuit 106. The licensing system 100 enables secure per-usage licensing and accounting to be implemented and enforced between Intellectual Property (IP) core vendors or providers (the "IP providers"), and IP core customers or users (the "IP users").

Figure 6:
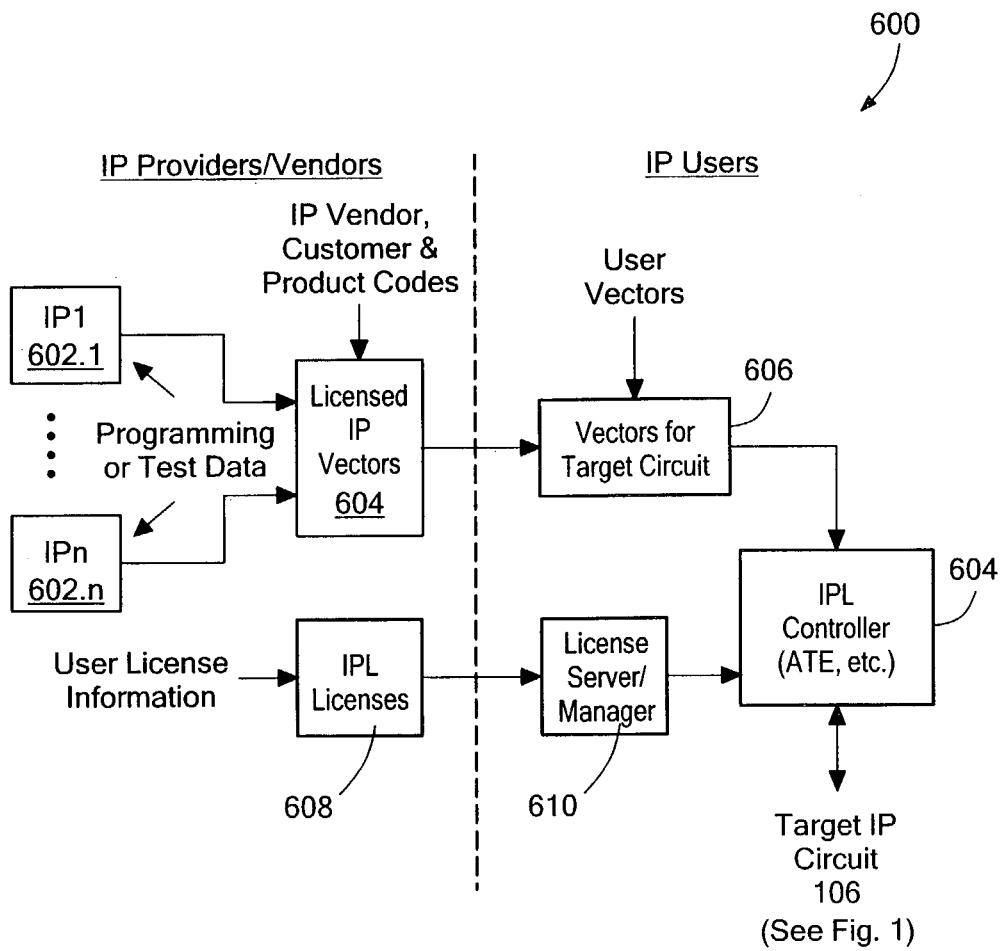
FIG. 6 is a block diagram of an environment in which the licensing system of FIG. 1 may be employed.

FIG. 6 depicts an illustrative electronic circuit design licensing environment 600 for IP providers and IP users employing the licensing system 100 including the licensing controller 104 (see also FIG. 1). The above-described licensing facility installed on the computer 102 is operative to allow the IP provider to deliver data IP1-IPn 602.1-602.n associated with a particular electronic circuit design as licensed vectors to the IP user. For example, the data IP1-IPn 602.1-602.n may be suitable for programmably configuring or testing the electronic circuit design within the target circuit 106. The licensing facility is further operative to tag the data IP1-IPn 602.1-602.n with Vendor (IP provider) Codes, Customer (IP user) Codes, and/or Product Codes (e.g., IP type), which are encrypted within the vector file with a key, like the encrypted attributes within the License Features file 110 (see FIG. 1), to prevent unwanted defeating of the licensing system. The IP user may apply the licensed vectors 604 directly to the target circuit 106 via the licensing controller 104. Alternatively, the IP user may combine the licensed vectors 604 with other vectors (e.g., non-licensed user vectors) to form a combined set of licensed/non-licensed vectors 606 for the target circuit 106, and then apply the set of vectors 606 to the target circuit 106 via the licensing controller 104.

As a result, the licensing environment 600 allows the licensed use of electronic circuit designs within the target circuit 106 to be reliably accounted for during the application of the vectors 604 and 606, thereby allowing reliable accounting of the licensed circuit designs on a per-usage, per-application, or per-instance basis. Further, because the licensing environment 600 provides for licensed test vector application, the IP user generally does not have to pay for circuit designs that fail testing (e.g., faulty circuit designs containing manufacturing defects). Licenses are therefore not used up when the target circuit fails during test vector application, and the IP user only pays for licensed circuit designs on a die or within an IC that are good. The licensing environment 600 also allows the IP user to add or delete licenses, e.g., licenses 608, or to move the licenses 608 from one licensing controller to another, by making suitable requests to the IP provider via a license server/manager 610. The IP user can therefore obtain any number of per-usage licenses for whatever licensed circuit design he or she requires. The IP user obtains these licenses as needed and/or dictated by business conditions, and is charged license fees based on the number and types of electronic circuit designs actually used.

Licensing Controller

Figure 2:
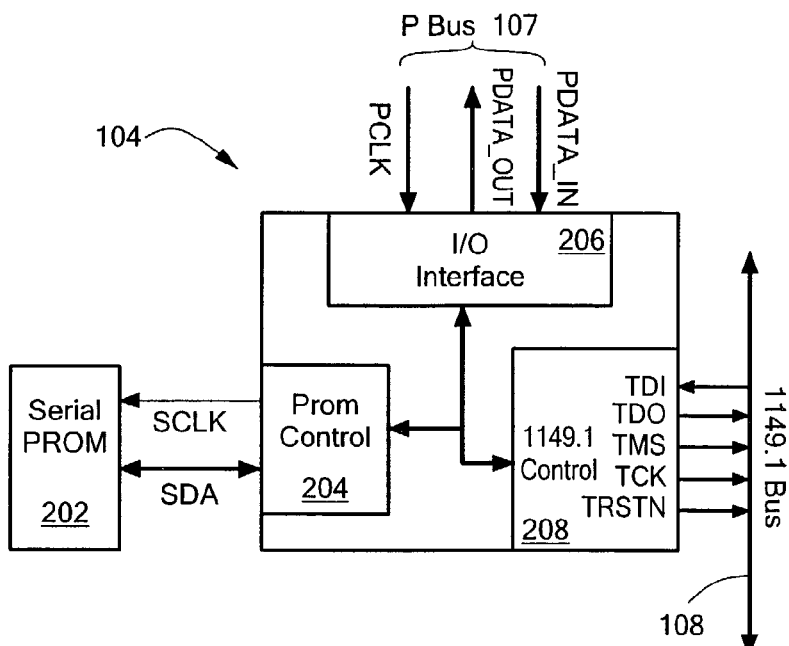
FIG. 2 is a block diagram of a licensing controller included in the system of FIG. 1.

FIG. 2 depicts an illustrative embodiment of the licensing controller 104 included in the licensing system 100 (see FIG. 1). In the illustrated embodiment, the licensing controller 104 includes a non-volatile data storage 202 (e.g., a serial PROM), a PROM control circuit 204, an I/O interface 206, and an IEEE 1149.1 bus control circuit 208. The I/O interface 206 is coupled to the P Bus 107, which includes a line for conveying a clock signal (PCLK) and respective PDATA_IN and PDATA_OUT data buses. Descriptions of the serial PROM 202, the PROM control 204, the I/O interface 206, and the IEEE 1149.1 bus control 208 are provided in the sections that follow.

I/O Interface

In the presently disclosed embodiment, the I/O interface 206 (see FIG. 2) includes circuitry configured to allow the computer 102 (see FIG. 1) and the licensing controller 104 to communicate with each other via the P Bus 107, which comprises a synchronous high speed parallel data bus. The PCLK signal on the P Bus 107 is used to synchronize the transfer of the input data PDATA_IN from the computer 102 to the licensing controller 104, and to synchronize the transfer of the output data PDATA_OUT from the controller 104 to the computer 102. Accordingly, the I/O interface 206 is configured to manage the transfer of data between both the PROM control 204 and the IEEE 1149.1 bus control 208, and the computer 102.

IEEE 1149.1 Bus Control

The IEEE 1149.1 bus control 208 (see FIG. 2) includes circuitry configured to receive parallel data and control signals from the I/O interface 206, and to convert these signals to the serial IEEE 1149.1 protocol for output on the IEEE 1149.1 bus 108 to the target circuit 106 (see FIG. 1). The circuitry of the IEEE 1149.1 bus control 208 is further configured to receive resultant serial data from the target circuit 106 over the IEEE 1149.1 bus 108, and to convert this serial data to parallel data before sending it to the I/O interface 206.

PROM Control

The PROM control 204 (see FIG. 2) is configured to receive parallel data and control signals from the I/O interface 206, and to convert the data and control signals to a suitable two-wire serial protocol before sending them to the serial PROM 202 over an SDA (Serial Data/Address) bus using an SCLK (serial clock) line. The PROM control 204 is further configured to receive serial data back from the serial PROM 202 over the SDA bus, and to convert this serial data to parallel form before sending it to the I/O interface 206.

Serial PROM

In the preferred embodiment, the serial PROM 202 (see FIG. 2) comprises a non-volatile memory configured to store data for the purpose of licensing core electronic circuit designs. For example, the serial PROM 202 may comprise a Serial Electrically Erasable Programmable Read Only Memory (SEEPROM) or any other suitable form of non-volatile read/write memory. The serial PROM 202 employs the above-mentioned two-wire serial protocol to interface to the PROM control 204. Specifically, the serial PROM 202 receives the serial clock signal SCLK, which is used to synchronize data and address transfers with the PROM control 204 over the bi-directional data/address bus SDA. For example, the serial PROM 202 may include 4096 addressable memory locations, and may be configured to provide byte-wide data.

Figure 3:
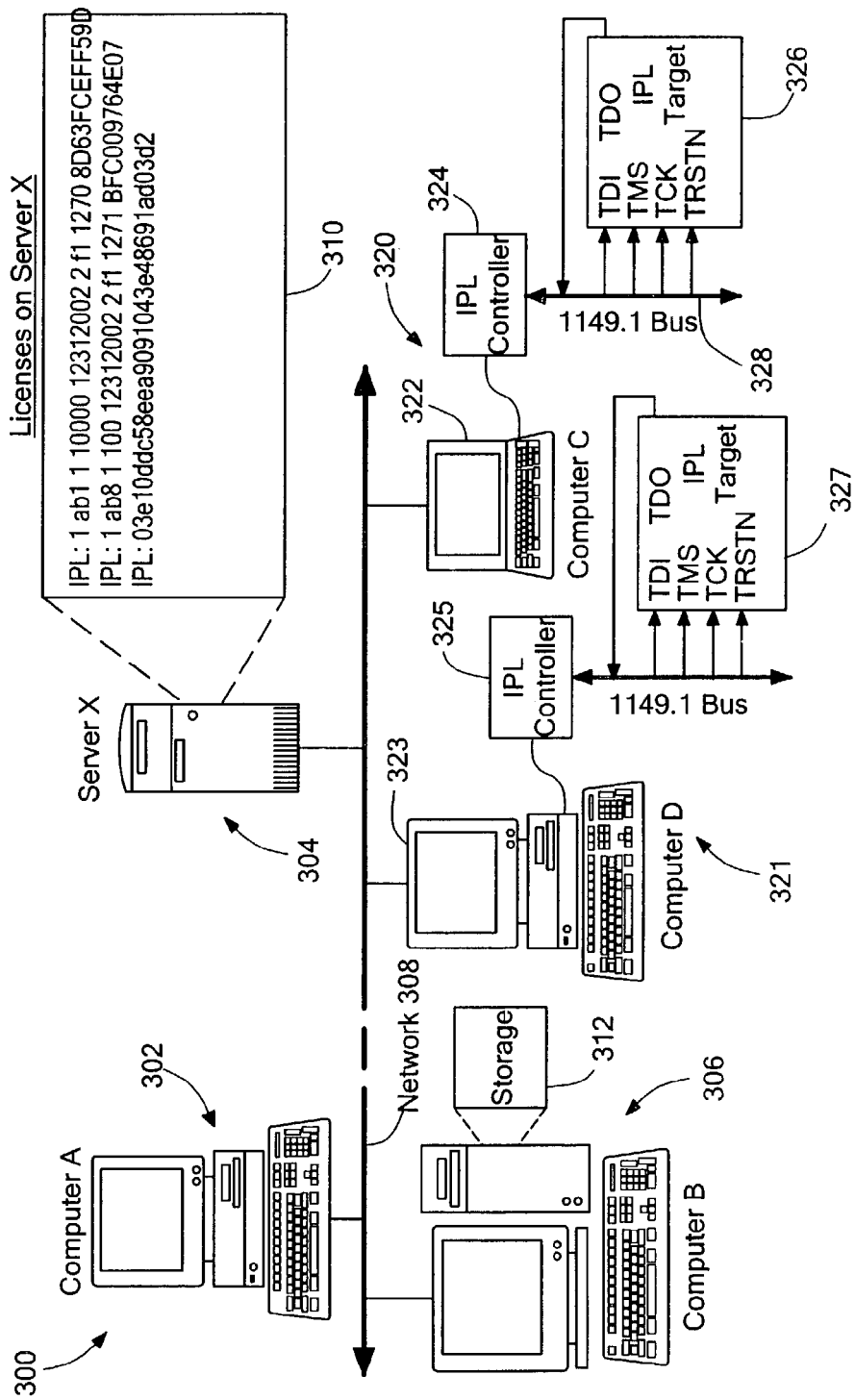
FIG. 3 is block diagram of a network-based licensing system according to the present invention.

It should be understood, however, that the licensing controller 104 may employ other suitable types of data storage, and may be configured to use other suitable communication protocols. For example, the licensing controller 104 may employ a parallel FLASH memory, or a Serial PROM that uses the IEEE 1149.1 protocol. Further, the licensing controller 104 may employ a data storage that is implemented separately from the licensing system 100. For example, FIG. 3 depicts an illustrative embodiment of a network-based licensing manager configuration 300, which includes a network 308, and a computer 306 and licensing systems 320-321 connected to the network 308. In the illustrated embodiment, each of the licensing systems 320-321 is like the licensing system 100 (see FIG. 1), with the exception that data associated with a licensed circuit design is stored in a data storage 312, e.g., a disk, included in the computer 306, instead of (or in addition to) being stored in the licensing controllers 324 and/or 325. In this way, the licensing systems 320-321 can be configured to access licensed circuit design data stored separately from the systems 320-321, e.g., the licensing data stored on the disk 312 accessible by the licensing systems 320-321 over the network 308. It is understood that in this configuration, the data storage 312 included in the computer 306 performs substantially the same functions as the non-volatile storage included in the licensing controllers 324-325.

License Manager

As mentioned above, FIG. 3 depicts the network-based licensing manager configuration 300. In the illustrated embodiment, the network-based licensing manager 300 includes the network 308, and the licensing systems 320-321 and computers 302, 304, and 306 connected to the network 308. For example, the network 308 may comprise a Local Area Network (LAN), a Wide Area Network (WAN), the Internet, or any other suitable network, and the computers 302, 304, and 306 may comprise suitable general-purpose computers.

The network-based licensing manager 300 of FIG. 3 will be better understood with reference to the following illustrative example. This example employs an illustrative License Features file 310 (see the expanded view of the file 310 in FIG. 3), which comprises a text file stored in the computer 304 ("Server X"). As shown in FIG. 3, the License Features file 310 includes three "IPL" licenses for circuit designs to be delivered or applied to target circuits 326 and/or 327. The IPL licenses include appropriate attributes and keys for each particular circuit design license, as described above with reference to the License Features file 110 (see FIG. 1). The License Features file 310 (see FIG. 3) can be accessed by each of the computers 302, 304, 306, and 322-323 on the network 308. In this example, the computer 322 is connected to the licensing controller 324, through which licensed vectors may be applied to the target circuit 326. Similarly, the computer 323 is connected to the licensing controller 325, through which licensed vectors may be applied to the target circuit 327. It should be appreciated that the network 308 may have one or more licensing controllers attached to computers on the network. The License Features File such as the files 110 (see FIG. 1) and 310 (see FIG. 3), and the format of the serial PROM 202 (see FIG. 2), are further described in the sections that follow.

License Features File

FIG. 4 depicts an illustrative representation of a License Features File 410, which may be employed in conjunction with the network-based licensing manager 300 (see FIG. 3). As shown in FIG. 4, the License Features File 410 comprises a text file including multiple lines of text. For example, each line may comprise a product line describing the license attributes for a particular core electronic circuit design. In the License Features File 410, each product line has the following format:

LICENSE_NAME: <Issue><Product><Version><+/−Licenses><Expiration><Vendor><Customer><IPLC_SN><Key>, in which the "LICENSE_NAME" field contains the name of the license, as provided by the IP provider, and the remaining fields are like the corresponding fields of the License Features file 110 described above with reference to FIG. 1.

As shown in FIG. 4, the third through seventh lines of the License Features File 410 indicate that the LICENSE_NAME is "IPL", which is the name of licenses for the core circuit design(s) to be delivered or applied to the target circuit 326 or 327 (see FIG. 3.) In the presently disclosed embodiment, the first two lines from the top of the License Features File 410 begin with a "#", which delimits them as optional comment lines. Specifically, the first line is included to describe the format of the fields in lines three through five, and in line seven. For example, in the third line, the Issue number is "1", the Product code is "ab1", the Version code is "1", the number of Licenses to be added is "10000", the Expiration code is "12312002", the Vendor code is "2", the Customer code is "f1", and the IP Licensing Controller Serial Number IPLC_SN is "1270". Further, in the seventh line, the Issue number is "1", the Product code is "dd0", the Version code is "7", the number of Licenses to be added is "3500", the Expiration code is "00000000", the Vendor code is "A", the Customer code is "f1", and the IPLC_SN is "1271".

It is noted that the serial number 1270 corresponds to the licensing controller 324, and the serial number 1271 corresponds to the licensing controller 325 (see FIG. 3). Further, when there are multiple lines for the same Product code, the Issue number may be used to track the additional licenses. For example, the fifth line of the License Features file 410 (see FIG. 4) is the second issue (Issue 2) of the license for Product code ab1. This line adds 300 licenses to the 10,000 licenses provided by Issue 1, as indicated in the third line of the file 410. The last issue of the licenses (e.g., a Last Issue number 512.5, see FIG. 5) is stored in the serial PROM 202 (see FIG. 2) so that the licensing system can easily determine when there is a newly issued license. The serial PROM 202 is subsequently updated to account for these newly issued licenses. In a similar manner, licenses may be deleted from the License Features file 410, or transferred from the License Features file of one licensing system to that of another licensing system.

It should be noted that the "Key" field is generated by the IP provider, and comprises a securely encrypted key. This license Key value takes into account the information in the corresponding product line, and other vendor-specific data. In the presently disclosed embodiment, the product lines three through seven (see FIG. 4) may not be modified by the IP user because doing so would cause the license Key value (as originally generated by the IP provider) to be inconsistent with the product license data in the file. In order to change any of the features or other data in the license file, the IP user typically obtains a new License Features file 410 from the IP provider. This assures that the core circuit design is used with the specified licensing controller(s), and in accordance with the requirements of the license.

In a further embodiment, a product line of the License Features file 410 may include one or more encrypted fields, as illustrated in line six of the License Features file 410. The encrypted value in line six represents the attributes of the particular electronic circuit design being licensed, and the license Key. Although this form of the product line does not have separate fields, it provides increased security because it is interpreted by the licensing system.

Serial PROM Format

In the presently disclosed embodiment, the serial PROM 202 (see FIG. 2) is configured to store licensing data to supplement the licensing information provided by the License Features File (e.g., the files 110 (see FIG. 1) and 310 (see FIG. 3)). The licensing data stored in the serial PROM 202 is used along with the license features information to track and manage delivery of licensed circuit designs.

Figure 5:
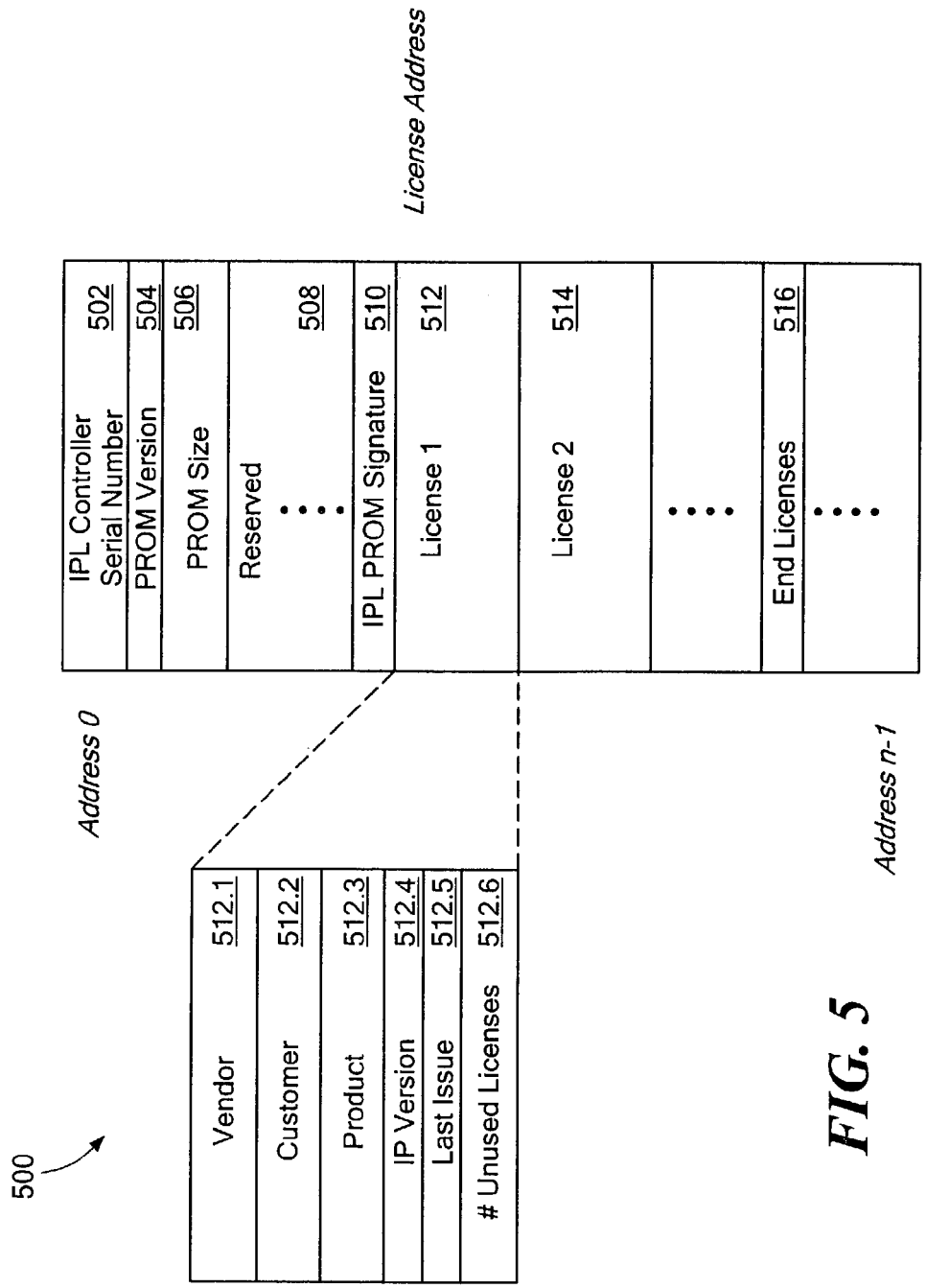
FIG. 5 is a diagram illustrating a memory format employed by the licensing system of FIG. 1.

FIG. 5 depicts an illustrative format 500 for storing licensing data in the serial PROM 202 (see FIG. 2). The data storing format 500 provides a plurality of bytes of data storage at address locations 0 through n−1. Specifically, the licensing data stored in the serial PROM includes a Licensing Controller Serial Number 502, a PROM Version 504, a PROM Size 506, and a PROM Signature 510, which is maintained to provide an integrity check of the data stored in the serial PROM. In the presently disclosed embodiment, only the vendor of the licensing controller 104 knows the algorithm used to generate and maintain the PROM signature 510. This provides increased security in the licensing of electronic circuit designs because the IP user cannot alter the licensing data stored in the serial PROM without causing the PROM Signature 510 to be inconsistent with the stored licensing data. The PROM Signature 510 is preferably verified each time the serial PROM is accessed for a circuit design license. Further, the PROM signature 510 is regenerated and updated whenever any licensing data stored in the serial PROM is updated.

As shown in FIG. 5, licenses issued to the IP user such as a License 1 512 and a License 2 514 are stored in the serial PROM starting at location "License Address". Each of the Licenses 512 and 514 is comprised of a number of bytes stored in the serial PROM. As shown in an expanded view in FIG. 5, the License 1 512 includes a Vendor indication 512.1, a Customer indication 512.2, a Product indication 512.3, and at least one IP Version code 512.4, as provided in the product line of the License Features File. This information indicates that the License 1 512 exists in the serial PROM. The License 1 512 further includes the Last Issue number 512.5, and a Number of Unused Licenses ("# Unused Licenses") 512.6. The information 512.1-512.6 can be updated and used to keep track of each licensed circuit design. It should be appreciated that the above-described licensing data may be stored in suitable data storage media implemented separately from the licensing system 100. For example, the licensing data may be stored on a disk that can be accessed by the licensing system 100 over a local bus or over a network. Specifically, the licensing information may be stored on the storage device 312 included in the computer 306, which is accessible by the licensing systems 320-321 over the network 308 (see FIG. 3). This allows for centralized accounting of the licensed electronic circuit designs across the multiple licensing controllers 324-325 on the network 308.

Identifying and Securing IP Cores

The licensing system 100 can be employed to identify which core electronic circuit design(s) may be programmably configured within a target circuit, and to secure the programmed circuit design so that it cannot be read back and reverse engineered, or inadvertently modified or erased.

One way of identifying a particular core electronic circuit design is by encoding the version, type, and/or manufacturer of the circuit design in a register that can be easily accessed and interrogated. For example, the IEEE 1149.1 and 1532 Standards specify two Data Registers (DRs)—a User Code DR and an ID Code DR—that have standard 32-bit formats, and can be used to specify the version, type, and manufacturer of the electronic circuit design.

Security features provided for programmable circuit designs typically include mechanisms for read protection, program protection, and erase protection, which can normally be used in any suitable combination. Further, these protection mechanisms are usually enabled using TAP Controller instructions, and disabled via a specific sequence of instructions, data patterns, or both. In some circuit designs, the read and program protections can only be disabled by first erasing the programmed contents of the target device. For this reason, some programmable circuits provide for a user definable key such as a Personal Identification Number (PIN) that can be used to unlock the protection mechanisms. The user definable key approach provides a secure way of protecting against reverse engineering or inadvertent modification/erasure. Some programmable circuits also provide for a permanent lock so that the protection mechanisms cannot be disabled. In the presently disclosed embodiment, the licensing system 100 generates a protection key, and stores the key in the serial PROM 202 of the licensing controller 104 (see FIGS. 1-2) so that only the controller 104 can read/program/erase the circuit design configured within the target circuit 106.

In an alternative embodiment, the target circuit 106 (see FIG. 1) is interrogated before configuration to determine whether the circuit 106 has already been programmed with a version of the licensed circuit design. For example, in the event it is determined that the target circuit 106 has already been programmed with the circuit design associated with the License 1 512 (see FIG. 5), the Number of Unused Licenses 512.6 is not decremented, and the programming operation is treated as an update (i.e., a re-programming of the target circuit with a newer version of the circuit design) instead of being accounted for as a first-time programmable configuration of the circuit design within the target circuit 106. However, because the User Code DR is programmable, this is a relatively unreliable way of identifying the current circuit design before programming. For this reason, the presently disclosed embodiment of the licensing system 100 employs an ID Signature Register (IDSR) 704 (see FIG. 7a) for identifying the current circuit design implemented within the target circuit.

Figure 7A:
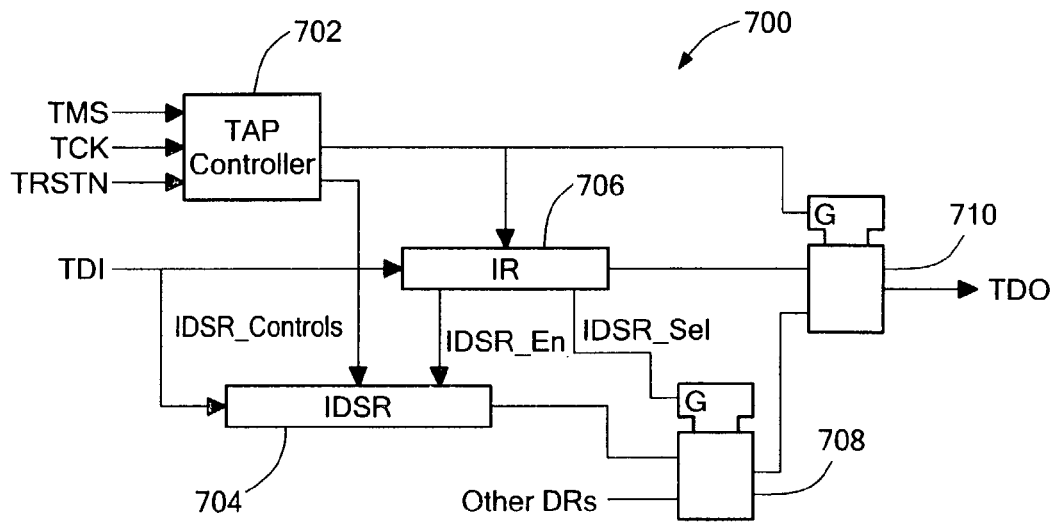
FIG. 7a is a block diagram of a test access port architecture having an ID signature register included in the licensing system of FIG. 1.

FIG. 7a depicts an illustrative embodiment of a Test Access Port (TAP) architecture 700 that may be implemented within the target circuit 106 (see FIG. 1). In the illustrated embodiment, the TAP architecture 700 includes a TAP controller 702 such as an IEEE 1149.1 TAP controller, an Instruction Register (IR) 706, and the IDSR 704 connected to the TAP controller 702 and the IR 706. The IDSR 704 is a user defined DR, and is enabled to generate a signature of the data on the Test Data Input (TDI) (see FIGS. 1 and 7) during programming of the target circuit 106. Specifically, the IDSR 704 is configured to create and store a signature of the licensed circuit design as it is being delivered via the TDI to the target circuit 106. The IDSR 704 can then be selected by the licensing controller 104, and scanned out of the Test Data Output (TDO) (see FIGS. 1 and 7), to identify the licensed circuit design currently programmed into the target circuit 106. In this way, the licensed circuit design can be securely and reliably identified before programming or re-programming the target circuit 106.

It is also desirable to have the capability of identifying and securing licensed electronic circuit designs implemented within non-programmable target circuits such as ASICs or RAMs. To that end, the presently disclosed embodiment provides an enable key that can be programmably configured to enable functional operation of the licensed circuit design. The enable key prevents use of the licensed circuit design before properly accounting for the licensed design.

Figure 7B:
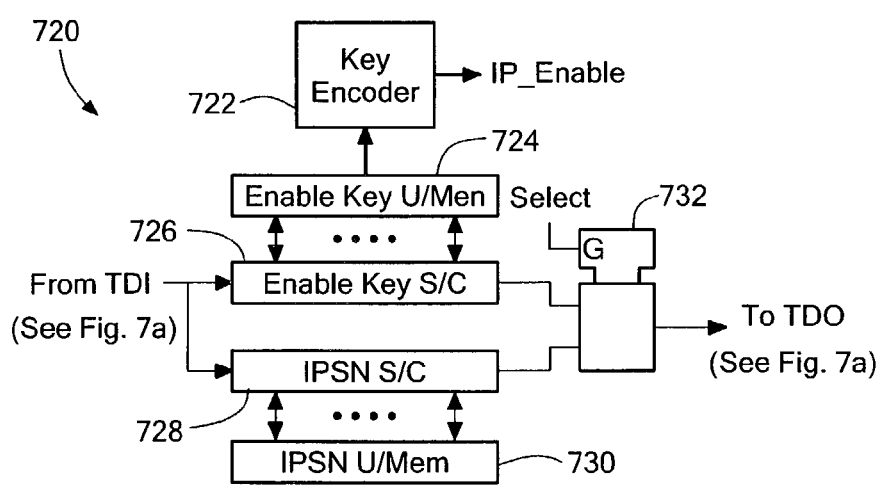
FIG. 7b is a block diagram of a circuit configuration for enabling functional operation of a licensed circuit design, for use in the licensing system of FIG. 1.

FIG. 7b depicts an illustrative circuit configuration 720 that employs the above-mentioned enable key to enable functional operation of a licensed circuit design within a non-programmable target circuit. In the illustrated embodiment, the circuit configuration 720 includes an enable key Update/Memory (U/Mem) register 724 for storing a representation of the enable key. For example, the enable key U/Mem register 724 may comprise a relatively small (e.g., 32-128 bits) programmable circuit or non-volatile memory. Moreover, the circuit configuration 720 may be implemented within the target circuit either separate from or as part of the licensed circuit design. Alternatively, the circuit configuration 720 may be implemented within the target circuit as part of the TAP controller.

Specifically, the representation of the enable key is serially provided to an enable key Shift/Capture (S/C) register 726 (see FIG. 7b) via the TDI input of the target circuit. For example, the enable key S/C register 726 may comprise a user-defined Data Register (DR) accessible between the TAP Controller's TDI and TDO pins (see FIG. 7a). Further, the enable key S/C register 726 operates in substantially the same manner as a conventional DR, with the exception that when the S/C register 726 is updated, its contents are stored in the enable key U/Mem register 724. Next, the enable key U/Mem register 724 provides the enable key to an enable key decoder circuit 722 for subsequent decoding. In the event the enable key is deemed valid after the decoding, the decoder circuit 722 asserts an IP_Enable signal (see FIG. 7b), which is used to enable functional operation of the licensed circuit design.

In the presently disclosed embodiment, the value of the enable key enabling functional operation of the licensed circuit design is predetermined by the IP provider, and is programmably configured either before or after the licensed circuit design is tested by the licensing system. For example, the licensing system 100 (see FIG. 1) may store the enable key in the serial PROM of the licensing controller 104. After the licensed circuit design has been properly accounted for by the licensing system 100, the licensing system 100 may then use the enable key to enable functional operation of the licensed circuit design implemented on the target circuit.

It is understood that the above-described enable key may be employed for other purposes within the licensing system 100 (see FIG. 1). For example, the enable key may be used to enable functional operation of support circuitry within the target circuit, such as a "helper" circuit configured to aid in testing the licensed circuit design. Further, the helper circuit may in turn be configured to enable and/or accelerate the testing of the licensed circuit design. The helper circuit may be implemented within the target circuit, either separate from or as part of the licensed circuit design.

It should further be appreciated that the licensing system may generate other circuit information in addition to the enable key for use in identifying and securing licensed circuit designs in non-programmable circuits. For example, circuit information such as an IP Serial Number (IPSN), an ID code, and/or a test and repair status may be generated by the licensing system, stored in the serial PROM of the licensing controller, and then programmably configured within the target circuit. It is noted that the IPSN may also be employed to track the licensed circuit design. The licensing system may access this circuit information to determine whether the licensed circuit design was previously accounted for, tested, and/or enabled via the enable key, or to access the test and repair status of the licensed circuit design.

In the presently disclosed embodiment, a representation of the IPSN is serially provided to an IPSN Shift/Capture (S/C) register 728 (see FIG. 7b) via the TDI input of the target circuit. Like the enable key S/C register 726, the IPSN S/C register 728 may comprise a user-defined DR accessible between the TAP Controller's TDI and TDO pins (see FIG. 7a). Further, the IPSN S/C register 728 operates in substantially the same manner as a conventional DR, with the exception that when the S/C register 728 is updated, its contents are stored in an IPSN U/Mem register 730, which may comprise a relatively small (e.g., 32-128 bits) programmable circuit or non-volatile memory. As shown in FIG. 7b, the illustrative circuit configuration 720 further includes a multiplexor 732 disposed between the S/C registers 726 and 728 and the TDO line, and configured for selectively providing the enable key or the IPSN to the TDO line.

Application and Operation of the Licensing System

Figure 8:
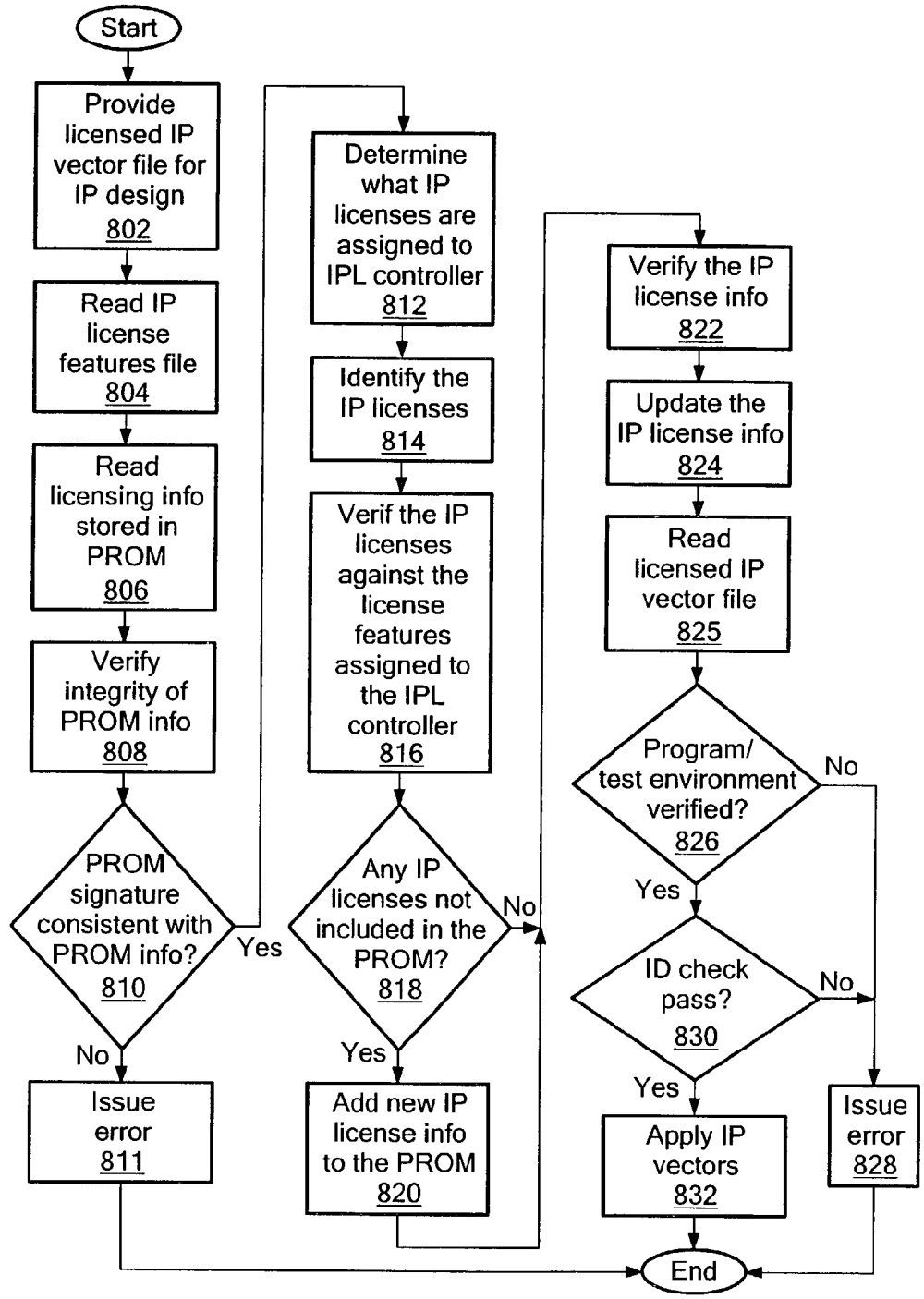
FIG. 8 is a flow diagram illustrating a method of delivering licensed circuit designs to a target circuit using the licensing system of FIG. 1.

A method of securely delivering/applying licensed core electronic circuit designs and vectors using the licensing system 100 (see FIG. 1) is illustrated by reference to FIG. 8. It is noted that the methods of the licensing system 100 are performed using the licensing facility installed on the computer 102, and the licensing data stored in the serial PROM 202 (see FIG. 2) of the licensing controller 104 (see FIG. 1). As depicted in step 802, a licensed vector file for a given core electronic circuit design(s) is provided by an IP provider. This licensed vector file includes programming and/or test data for the circuit design, and vendor, customer, and product codes for respective circuit designs licensed in the vectors. Next, a license features file is read, as depicted in step 804, to determine which circuit design features are currently licensed. The information contained in the serial PROM 202 is then read, as depicted in step 806.

Next, the integrity of the information stored in the serial PROM 202 is verified, as depicted in step 808, against a PROM signature stored in the serial PROM. A decision is then made, as depicted in step 810, as to whether the PROM signature is consistent with the stored PROM information. In the event the PROM signature is inconsistent with the stored PROM information, thereby indicating that the contents of the serial PROM have been improperly altered, an error is issued, as depicted in step 811, to the IP user via the computer 102, and the vectors are not applied. Otherwise, a determination is made, as depicted in step 812, as to what licenses are assigned to the respective licensing controller 104. Specifically, the licensing controller serial number (i.e., IPLC_SN) included in the PROM information is compared to the respective product lines of the license features file, and the product lines matching the licensing controller serial number are determined to be licenses assigned to this licensing controller.

Next, the circuit design licenses (as read from the serial PROM) are identified, as depicted in step 814, via their respective vendor, customer, and product codes. The licenses are then verified, as depicted in step 816, against the license features assigned to this licensing controller 104. Next, a determination is made, as depicted in step 818, as to whether there are any circuit design licenses in the license features file that are not included in the serial PROM 202. In the event there is a circuit design license that is included in the license features file but not the serial PROM, this license is regarded as a new license, and the corresponding license information is added, as depicted in step 820, to the serial PROM along with a newly generated PROM signature.

The circuit design license information is then verified, as depicted in step 822, to see if any further updates need to be made to the licensing data stored in the serial PROM 202. Specifically, the licensing data in the serial PROM can be updated to add to/subtract from the number of unused circuit design licenses, remove licenses, re-assign licenses to another licensing controller, or update the IP version. After the circuit design licenses have been verified, all necessary updates are made, as depicted in step 824, to the serial PROM licensing data along with a newly generated PROM signature.

Having verified the circuit design licenses and programmed any necessary updates into the serial PROM 202, the licensed vector file is read, as depicted in step 825, to determine the circuit design license(s) needed to apply the vectors. Next, the programming/test environment (i.e., the target circuit 106 including the licensed circuit design) is verified, as depicted in step 826, to assure the environment's integrity, and to validate that the circuit design is being accessed in a manner authorized by the IP provider. If the environment is not as expected, then an error is issued, as depicted in step 828, to the IP user via the computer 102, and the vectors are not applied. Following verification of the programming/test environment, an identification check is performed, as depicted in step 830, on the target circuit 106 for each of the licensed circuit designs. For example, depending on the target circuit, one or more of the user code, ID code, or IDSR values may be verified. If the target circuit 106 fails the identification check, i.e., the circuit is determined to be an incorrect component or circuit for the licensed vectors, then an error is issued, as depicted in step 828, to the IP user via the computer 102, and the vectors are not applied. Otherwise, the licensed vectors are applied, as depicted in step 832, to the target circuit 106 via the licensing controller 104 and the IEEE 1149.1 bus 108.

Figure 9:
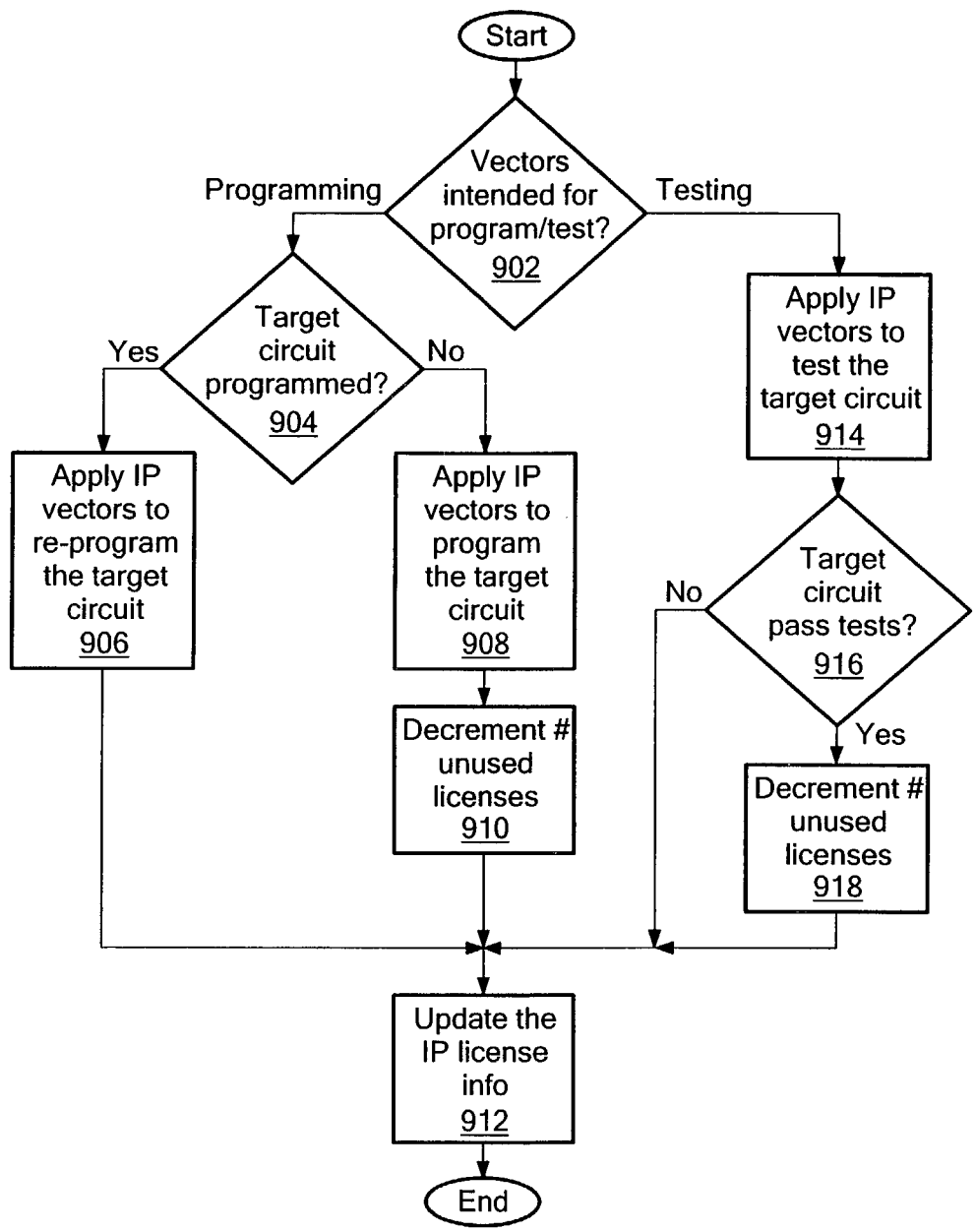
FIG. 9 is a flow diagram illustrating a method of accounting for licensed circuit designs delivered to a target circuit using the licensing system of FIG. 1.

A method of reliably accounting for the licensed circuit designs/vectors applied to the target circuit using the licensing system 100 (see FIG. 1) is illustrated by reference to FIG. 9. As depicted in step 902, a determination is made as to whether the licensed vectors are for use in programmably configuring or testing the licensed circuit design. In the event the licensed vectors are for programming purposes, the above-described identification check (see step 830 of FIG. 8) is used to determine, as depicted in step 904, whether the target circuit 106 is currently programmed (e.g., with an older version of the circuit design) or not yet programmed within the target circuit. If the target circuit 106 has been programmed with an older version of the circuit design, then the vectors are applied, as depicted in step 906, to the circuit. However, the number of unused licenses value in the serial PROM 202 is not decremented because the target circuit is being re-programmed with the same circuit design (although presumably with a newer version). It is appreciated that the license for this circuit design was accounted for when the older version of the design was originally programmed into the target circuit. If the target circuit 106 has not been programmed or has been programmed with a circuit design other than the licensed circuit design, then the target circuit is programmed, as depicted in step 908, and the number of unused licenses value is decremented, as depicted in step 910. Once all of the licensed circuit designs in the vectors have been programmed or reprogrammed, the serial PROM data is updated, as depicted in step 912, including the PROM signature.

In the event the licensed vectors are for testing purposes, the vectors are applied, as depicted in step 914, to the circuit design within the target circuit 106. A determination is then made, as depicted in step 916, as to whether the circuit design within the target circuit has passed the tests. In the event the target circuit 106 has passed the tests, the number of unused license values for the circuit design licensed in the vectors is decremented, as depicted in step 918. Next, the serial PROM 202 is updated, as depicted in step 912, along with the PROM signature. In the event the target circuit 106 fails the tests, the number of unused licenses values for the failing circuit design is not decremented. In this way, IP users do not end up paying for licensed circuit designs that do not pass the testing because of, e.g., manufacturing defects in the circuits.

It will further be appreciated by those of ordinary skill in the art that modifications to and variations of the above-described circuit design licensing system and methods may be made without departing from the inventive concepts disclosed herein. Accordingly, the invention should not be viewed as limited except as by the scope and spirit of the appended claims.

What is claimed is:

1. A method of licensing an electronic circuit design for use within at least one target IC (integrated circuit), comprising the steps of:

licensing the electronic circuit design for use within the target IC on a per-usage basis, including:

storing first licensing information in a computerized data storage, the first licensing information including a product code for the electronic circuit design, and a unique serial number for a computerized licensing controller, the computerized data storage being communicably coupled to the computerized licensing controller;

reading, by the computerized licensing controller, the unique serial number for the computerized licensing controller from the computerized data storage, and identifying at least one license that is assigned to the unique serial number for the computerized licensing controller, wherein the first licensing information further includes an updatable number indicating how many of the at least one license assigned to the unique serial number for the computerized licensing controller are currently unused;

receiving, at the computerized licensing controller, test data for testing the electronic circuit design within the target IC or programming data for configuring the electronic circuit design within the target IC, the test data or programming data including second licensing information, the second licensing information including the product code for the electronic circuit design;

reading, by the computerized licensing controller, the product code for the electronic circuit design from the computerized data storage, and verifying, by the computerized licensing controller, that the product code for the electronic circuit design included in the second licensing information corresponds with the product code for the electronic circuit design read from the computerized data storage;

having verified that the product code for the electronic circuit design included in the second licensing information corresponds with the product code for the electronic circuit design read from the computerized data storage, reading, by the computerized licensing controller, the updatable number from the computerized data storage, and verifying, by the computerized licensing controller, that one of the at least one license assigned to the unique serial number for the computerized licensing controller is currently unused based at least in part on the updatable number;

having verified that one of the at least one license assigned to the unique serial number for the computerized licensing controller is currently unused, delivering, via the computerized licensing controller, the test data or programming data to the target IC; and if the applied test data passes one or more tests or the programming data is applied to the target IC for the first time, updating, by the computerized licensing controller, the updatable number stored in the computerized data storage.

2. The method of claim 1 further including, generating a signature of the programming data as the programming data is delivered to the target IC.

3. The method of claim 2 further including storing the signature of the programming data within the target IC.

4. The method of claim 1 wherein the computerized data storage is associated with the computerized licensing controller.

5. The method of claim 1 wherein the computerized data storage is local to the computerized licensing controller.

6. The method of claim 1 wherein the computerized data storage is remote from the computerized licensing controller.

7. The method of claim 1 wherein the storing of the first licensing information includes sending the first licensing information to the computerized data storage over at least one network.

8. The method of claim 1 wherein the computerized data storage is communicably coupled to the computerized licensing controller by at least one network, and wherein the reading of the product code from the computerized data storage includes receiving, at the computerized licensing controller, the product code from the computerized data storage over the at least one network, and wherein the reading of the unique serial number from the computerized data storage includes receiving, at the computerized licensing controller, the unique serial number from the computerized data storage over the at least one network.

9. The method of claim 1 wherein the receiving of the test data for testing the electronic circuit design within the target IC or the programming data for configuring the electronic circuit design within the target IC includes receiving the test data or the programming data at the computerized licensing controller over at least one network.

10. The method of claim 1 wherein the computerized data storage is communicably coupled to the computerized licensing controller by at least one network, and wherein the reading of the updatable number stored in the computerized data storage includes receiving, at the computerized licensing controller, the updatable number from the computerized data storage over the at least one network.

11. The method of claim 1 wherein the first licensing information further includes an issue number for the at least one license, and wherein the method further includes:

reading, by the computerized licensing controller, the issue number from the computerized data storage; and determining whether the at least one license corresponds to a newly issued license based at least in part on the issue number.

12. The method of claim 1 wherein a signature of prior programming data is stored within the target IC, and wherein the determining of whether the target IC has already been programmed with a version of the electronic circuit design includes reading the signature of the prior programming data stored within the target IC, and determining whether the target IC has already been programmed with a version of the electronic circuit design based at least in part on the signature of the prior programming data.

13. The method of claim 1 wherein the updating of the updatable number includes decrementing the updatable number.

* * * * *